(12) United States Patent
Mihara et al.

(10) Patent No.: US 9,346,172 B2
(45) Date of Patent: May 24, 2016

(54) PARALLEL ROBOT

(71) Applicant: KABUSHIKI KAISHA YASKAWA DENKI, Kitakyushu-shi (JP)

(72) Inventors: Nobuhiko Mihara, Fukuoka (JP); Takashi Sanada, Fukuoka (JP); Ryuichiro Tominaga, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 161 days.

(21) Appl. No.: 14/162,742

(22) Filed: Jan. 24, 2014

(65) Prior Publication Data

US 2014/0251058 A1 Sep. 11, 2014

(30) Foreign Application Priority Data

Mar. 5, 2013 (JP) .................................. 2013-043168

(51) Int. Cl.
*B25J 17/02* (2006.01)
*B25J 19/00* (2006.01)
*B25J 9/00* (2006.01)

(52) U.S. Cl.
CPC *B25J 17/02* (2013.01); *B25J 9/003* (2013.01); *B25J 19/0025* (2013.01); *Y10T 74/20335* (2015.01)

(58) Field of Classification Search
CPC .................... Y10T 74/20305; Y10T 74/20329; Y10T 74/20335; Y10T 74/20341; Y10T 74/20317; B25J 15/00; B25J 15/0616; B25J 17/0283; B25J 17/0266; B25J 9/0051

USPC ............... 74/490.05, 490.01, 490.06, 490.07, 74/490.03; 414/729, 735, 751.1, 917; 901/29, 14, 15, 18, 26, 27, 28, 40
See application file for complete search history.

(56) References Cited

U.S. PATENT DOCUMENTS

| 7,549,355 | B2 * | 6/2009 | Schuler | B25J 17/0266 74/490.06 |
| 7,735,390 | B2 * | 6/2010 | Nabat | B25J 17/0266 74/490.03 |
| 8,413,539 | B2 * | 4/2013 | Chenu | B25J 17/0266 414/735 |
| 2004/0143876 | A1 | 7/2004 | Persson et al. | |

(Continued)

FOREIGN PATENT DOCUMENTS

| CN | 102049776 | 5/2011 |
| DE | 102011101206 | 11/2012 |

(Continued)

OTHER PUBLICATIONS

European Patent Office Communication for corresponding EP Application No. 14151897.7-1712, Sep. 15, 2014.

(Continued)

*Primary Examiner* — William Kelleher
*Assistant Examiner* — Leonard J Archuleta
(74) *Attorney, Agent, or Firm* — Mori & Ward, LLP

(57) ABSTRACT

A parallel robot includes a plurality of actuators, a wrist portion, and a plurality of arms that respectively connect the wrist portion to the plurality of actuators. The wrist portion includes a base portion that includes a plurality of connection portions respectively connected to the plurality of arms and a rotation member that rotates about a rotation axis located outside an area surrounded by the plurality of connection portions. The rotation member is provided with a through-hole that is formed along the rotation axis.

12 Claims, 6 Drawing Sheets

(56) References Cited

U.S. PATENT DOCUMENTS

| | | | |
|---|---|---|---|
| 2006/0101936 A1 | 5/2006 | Inoue et al. | |
| 2009/0200432 A1* | 8/2009 | Inoue | B25J 19/0025 248/51 |
| 2009/0269180 A1* | 10/2009 | Wappling | B25J 15/04 414/729 |
| 2010/0206120 A1 | 8/2010 | Kinoshita et al. | |
| 2011/0033275 A1* | 2/2011 | Lehmann | B25J 15/0616 414/737 |
| 2011/0097184 A1* | 4/2011 | Kinoshita | B25J 17/0266 414/589 |
| 2011/0291433 A1* | 12/2011 | Feng | B25J 17/0266 294/65 |
| 2012/0079908 A1* | 4/2012 | Long | B25J 9/0051 74/490.05 |
| 2012/0118097 A1* | 5/2012 | Ilch | B25J 17/0266 74/490.05 |
| 2012/0207574 A1* | 8/2012 | La Rovere | B25J 15/0616 414/751.1 |

FOREIGN PATENT DOCUMENTS

| | | |
|---|---|---|
| JP | 2002-532269 | 10/2002 |
| JP | 2004-223635 | 8/2004 |
| JP | 2005-28558 | 2/2005 |
| JP | 2013-39650 | 2/2013 |
| WO | WO 2009/130115 | 10/2009 |

OTHER PUBLICATIONS

Chinese Office Action for corresponding CN Application No. 201410037966.2, Jul. 1, 2015.

Extended European Search Report for corresponding EP Application No. 14151897.7-1712, Apr. 8, 2014.

Chinese Office Action for corresponding CN Application No. 201410037966.2, Jan. 26, 2016.

* cited by examiner

PARALLEL ROBOT

CROSS-REFERENCE TO RELATED APPLICATION

This application is based upon and claims the benefit of priority from Japanese Patent Application No. 2013-043168, filed Mar. 5, 2013, the entire contents of which are incorporated herein by reference.

BACKGROUND

1. Field

The present disclosure relates to a parallel robot.

2. Related Art

WO 2009/130115 discloses a parallel link robot (delta robot) that includes a gripping element as the end effector.

SUMMARY OF THE INVENTION

According to the present disclosure, there is provided a parallel robot including: a plurality of actuators; a wrist portion; a plurality of arms that respectively connect the wrist portion to the plurality of actuators, wherein the wrist portion includes a base portion that includes a plurality of connection portions respectively connected to the plurality of arms, and a rotation member that rotates about a rotation axis located outside an area surrounded by the plurality of connection portions, and wherein the rotation member is provided with a through-hole formed along the rotation axis.

DETAILED DESCRIPTION

Figure 1:
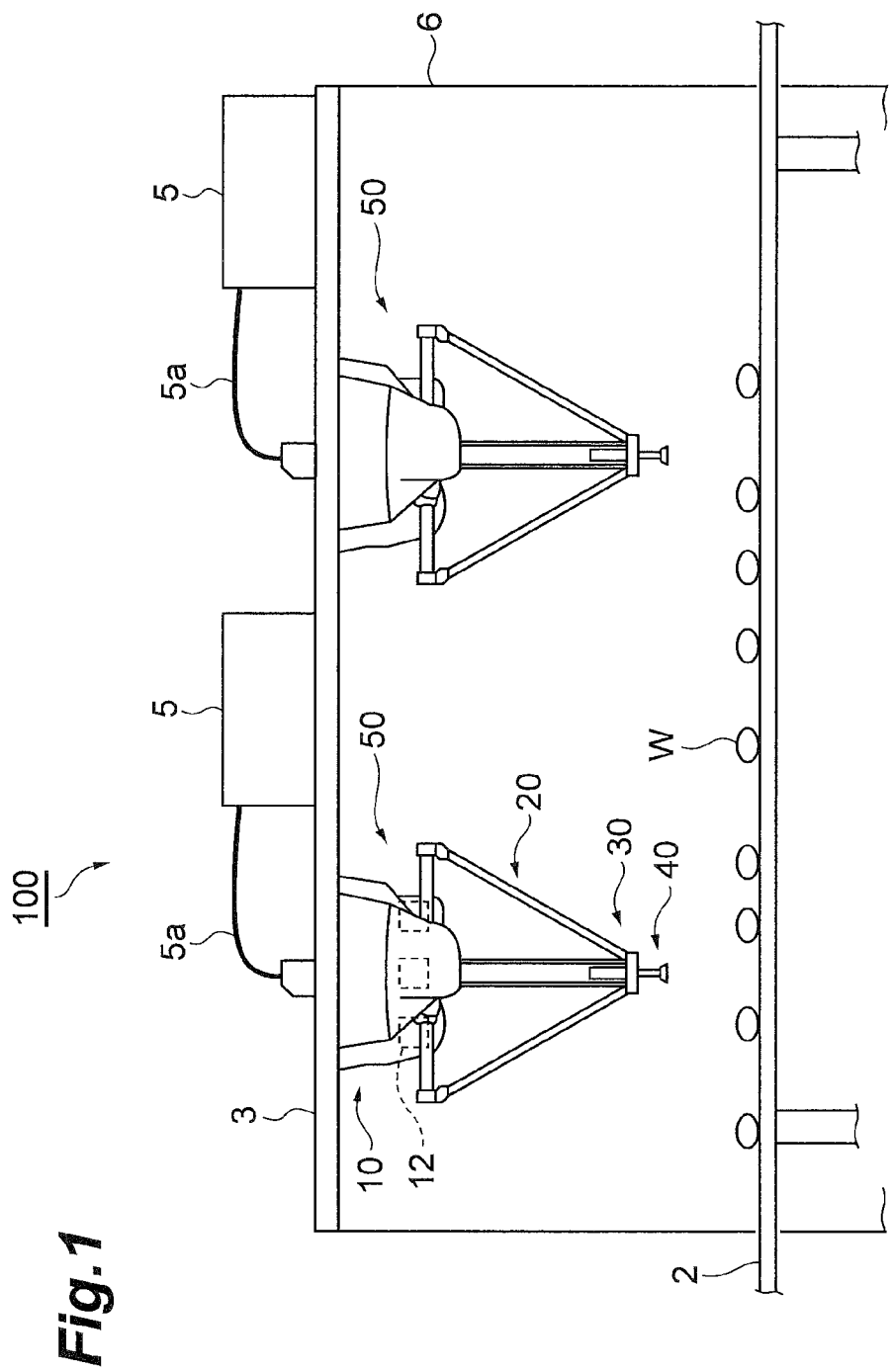
FIG. 1 is a schematic configuration diagram illustrating an example of a picking device that includes a parallel robot according to an embodiment.

Hereinafter, an embodiment will be described with reference to the drawings. In the description, the same reference numerals will be given to the same components or the components having the same functions, and the description thereof will not be repeated. Here, a picking device equipped with parallel robots (delta robots, parallel link robots) will be exemplified.

A picking device 100 illustrated in FIG. 1 is a device that performs a picking and placing operation in which workpieces W conveyed by a conveyor 2 are picked up by parallel robots 50 and are disposed at different places. The picking device 100 includes a ceiling plate 3 that is disposed above the conveyor 2, two controllers 5 that are fixed to the upper side of the ceiling plate 3, two parallel robots 50 that are fixed to the lower side of the ceiling plate 3, and a transparent side wall 6 that surrounds the movable area of the parallel robots 50. Furthermore, the number of the parallel robots 50 is not limited to two, and may be one or three or more.

The parallel robots 50 are suspended on the ceiling plate 3. The motion of each parallel robot 50 is controlled by each controller 5. The controller 5 is connected to the parallel robot 50 through a cable 5a. The ceiling plate 3 may be supported horizontally by plural support pillars (not illustrated) or may be suspended horizontally from a ceiling of a factory. Further, the ceiling of the factory may serve as the ceiling plate 3.

Figure 2:
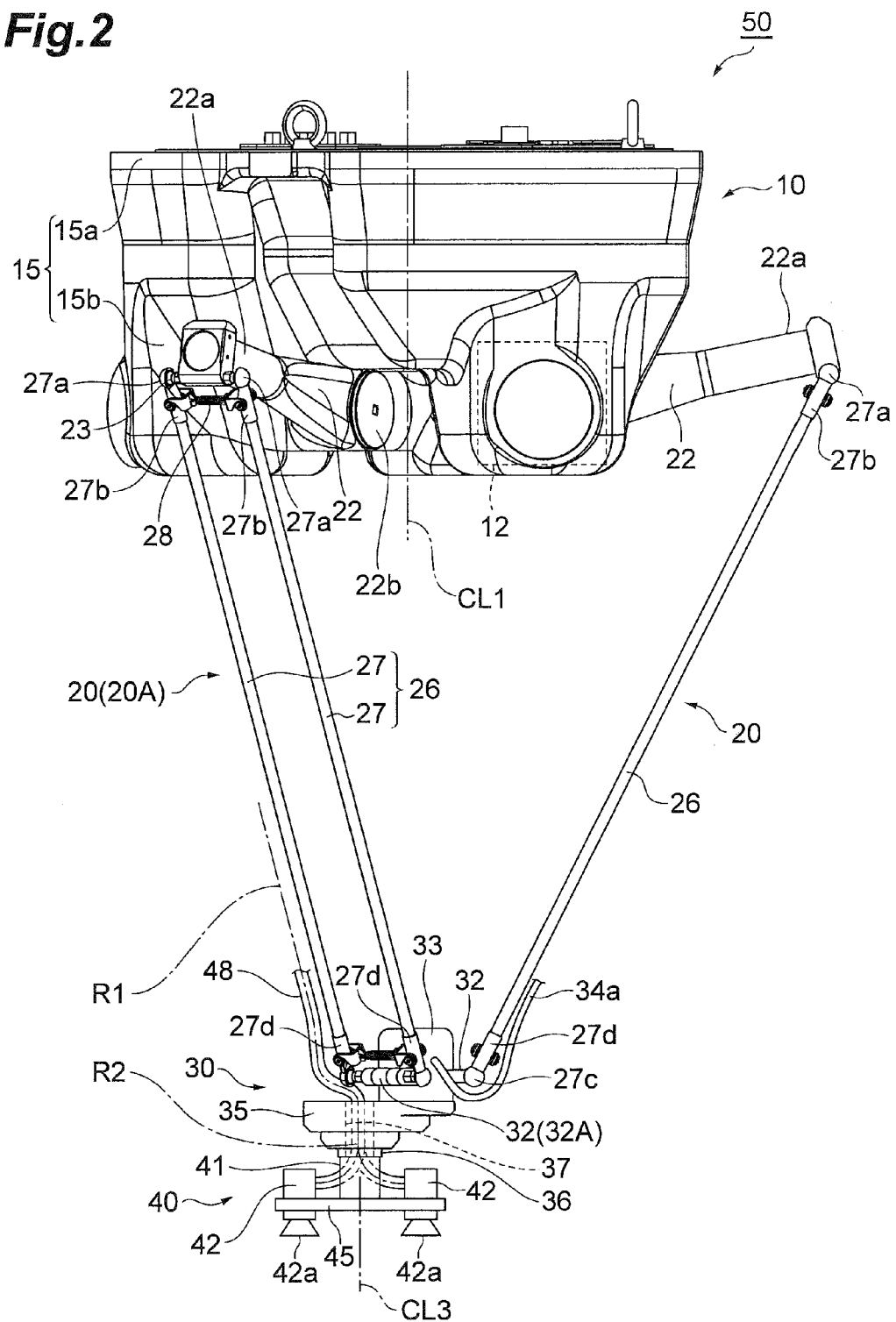
FIG. 2 is an enlarged side view of the parallel robot of FIG. 1.
Figure 3:
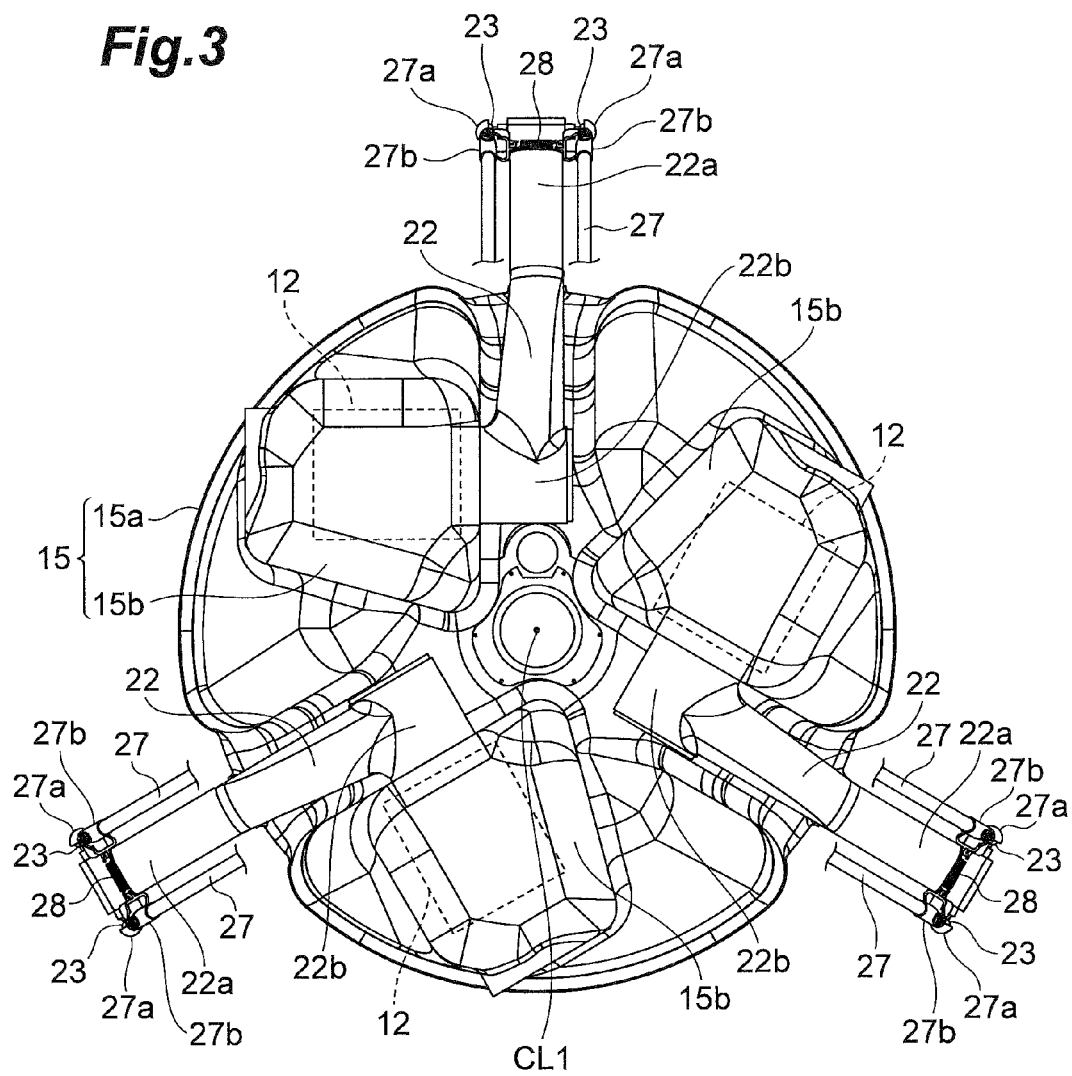
FIG. 3 is a bottom view of a robot body of FIG. 2.
Figure 4:
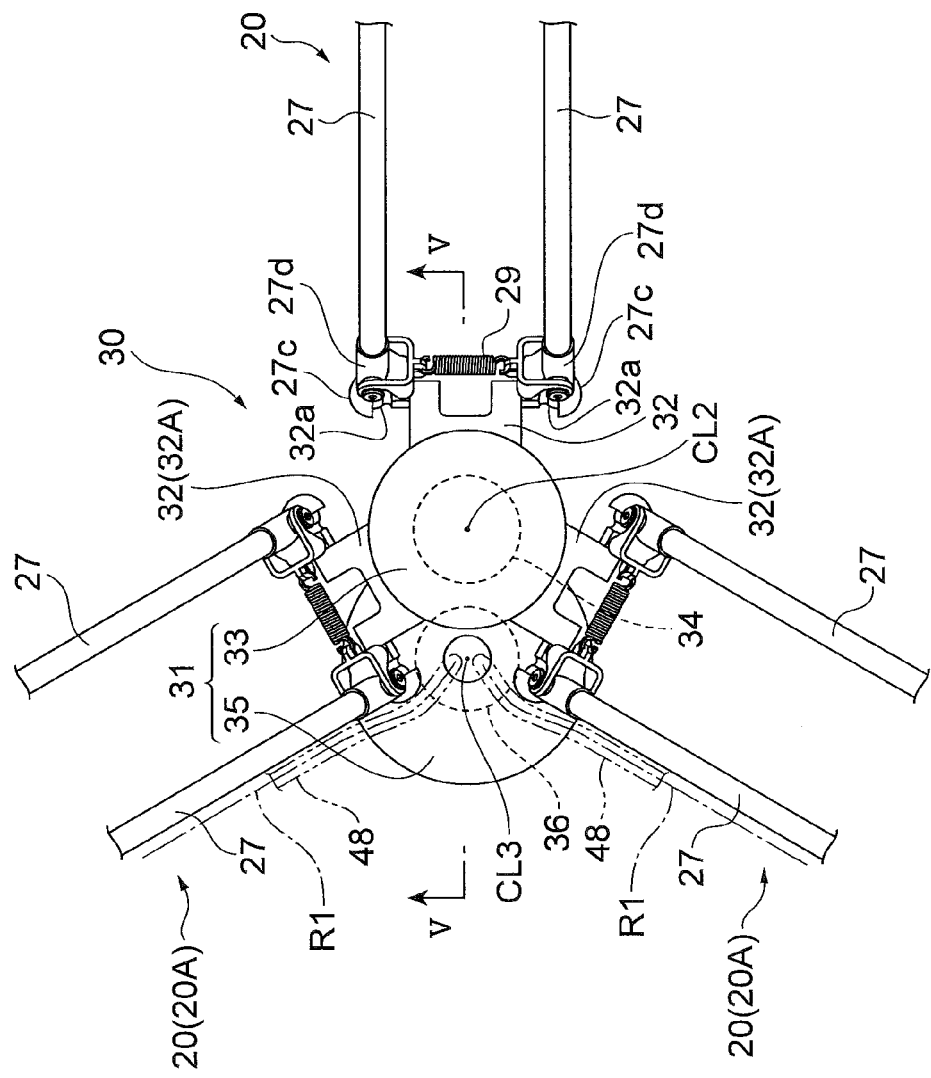
FIG. 4 is a top view of a wrist portion of FIG. 2.

Referring to FIGS. 2 to 4, the parallel robot 50 according to the embodiment will be described. As illustrated in FIGS. 2 and 3, the parallel robot 50 includes a robot body 10 that has three actuators 12 built therein, one wrist portion 30, three arms 20 that respectively connect the wrist portion 30 to the three actuators 12, and an end effector 40 that is attached to the wrist portion 30. Hereinafter, the respective configurations will be described.

The robot body 10 includes three actuators 12 and a housing 15 that accommodates the actuators. Each actuator 12 is a drive source for the arm 20, and includes, for example, a motor, a speed reducer, and a sensor. The housing 15 includes an attachment portion 15a and three bulged portions 15b. The attachment portion 15a is substantially formed in a circular shape, and is attached to the lower surface of the ceiling plate 3. Three bulged portions 15b are bulged downward from the attachment portion 15a so as to respectively accommodate the actuators 12. Furthermore, three bulged portions 15b are provided so as to surround the center axis CL1 of the attachment portion 15a.

Each arm 20 includes a base link 22 that corresponds to an upper arm and a connection link 26 that corresponds to a lower arm. The base link 22 extends outward between two adjacent bulged portions 15b. The connection link 26 connects a tip end 22a of the base link 22 to the wrist portion 30, and includes two bar-shaped members 27. As the material of the base link 22 and the connection link 26, for example, a light material such as carbon fiber reinforced plastics (CFRP) may be employed.

A base end 22b of the base link 22 is connected to the actuator 12. The base link 22 rotates by the operation of the actuator 12. By this rotation, the tip end 22a moves upward and downward. In the description below, the "base link 22 rotates upward" indicates that the base link 22 rotates so that the tip end 22a moves upward, and the "base link 22 rotates downward" indicates that the base link 22 rotates so that the tip end 22a move downward. Furthermore, the tip end 22a includes a pair of spherical convex portions 23. The pair of spherical convex portions 23 is disposed along a line parallel to the rotation axis of the base link 22, and each spherical convex portion protrudes outward. The pair of spherical convex portions constitutes a ball joint with respect to the connection link 26.

The two bar-shaped members 27 that constitute the connection link 26 extend in parallel, and each upper end 27b is provided with a cup 27a. The cup 27a constitutes a ball joint with respect to the spherical convex portion 23. The two bar-shaped members 27 are disposed so that the respective cups 27a cover the spherical convex portions 23 from the outside, and the upper ends 27b are connected to each other through an elastic member 28 such as a coil spring.

Each of the lower ends 27d of the two bar-shaped members 27 is provided with a cup 27c, and the cup 27c constitutes a ball joint with respect to the connection portion 32 of the wrist portion 30. The connection portion 32 includes a pair of spherical convex portions 32a. The cups 27c of the two bar-shaped members 27 cover the spherical convex portions 32a from the outside, and the lower ends 27d of the two bar-shaped members 27 are connected to each other through an elastic member 29 such as a coil spring. By the ball joint, the connection link 26 is three-dimensionally rotatable with respect to the base link 22, and the wrist portion 30 is three-dimensionally rotatable with respect to the connection link 26.

The wrist portion 30 is supported by three arms 20 respectively connected to the actuators 12 at the base ends 22b. The actuator 12 rotates the base link 22 upward or downward in response to the command from the controller 5, so that the wrist portion 30 moves. Specifically, the wrist portion 30 moves upward when the three base links 22 rotate upward at the same time, and the wrist portion 30 moves downward when the three base links 22 rotate downward at the same time. When some of the base links 22 rotate upward and the other base links 22 rotate downward, the wrist portion 30 moves toward the base link 22 that rotates upward.

Figure 5:
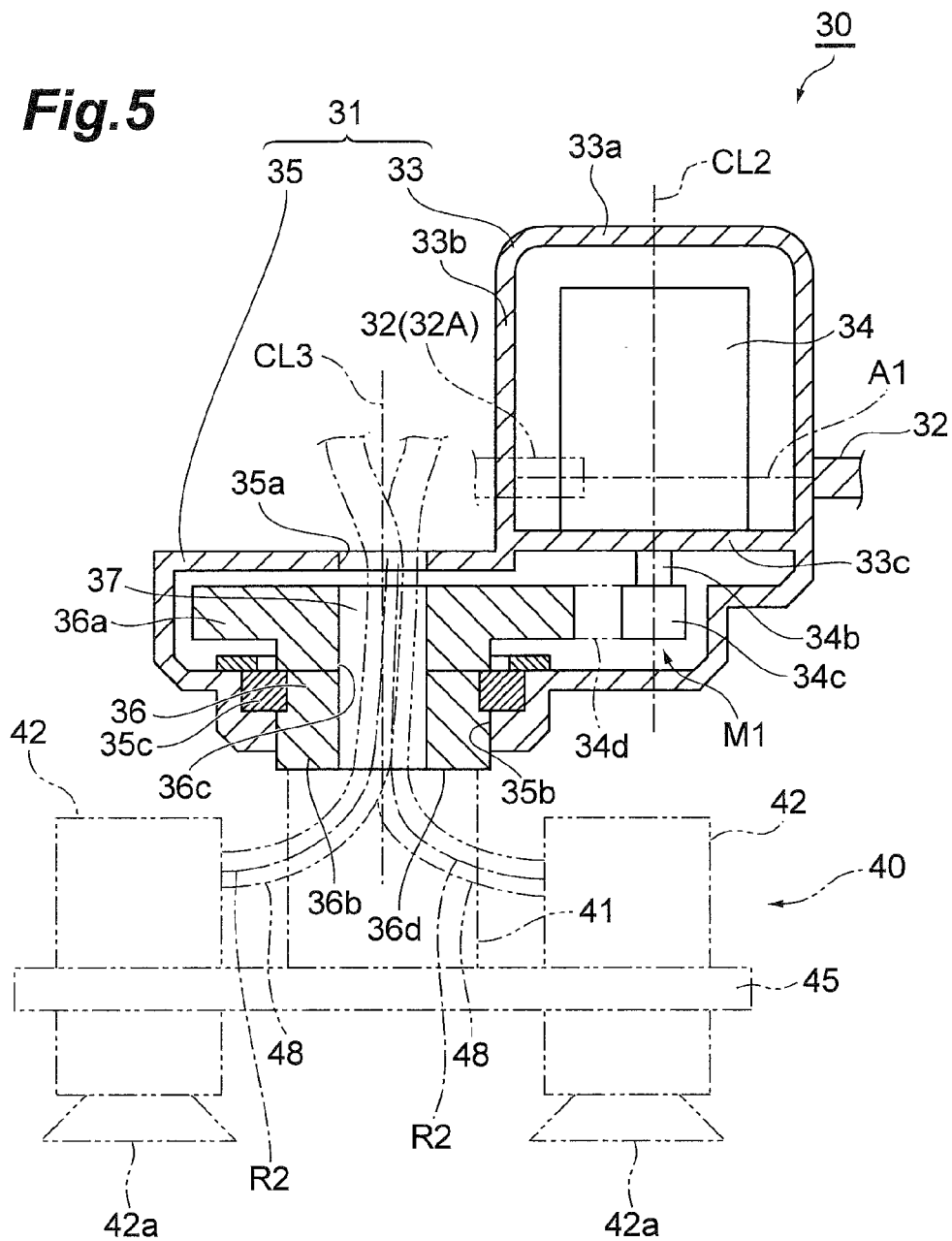
FIG. 5 is a cross-sectional view taken along the line V-V of FIG. 4.

Referring to FIGS. 4 and 5, the configuration of the wrist portion 30 will be described in detail. The wrist portion 30 includes a base portion 33 and a projection portion 35. The base portion 33 and the projection portion 35 are covered by a housing 31. The base portion 33 includes plural connection portions 32 that are respectively connected to the arms 20. The projection portion 35 is provided below the base portion 33 and at a position offset sideward from the position of the base portion 33. The end effector 40 is rotatably attached to the projection portion 35.

The base portion 33 includes a circular ceiling plate 33a, a cylindrical side wall 33b, a partition plate 33c that is parallel to the ceiling plate 33a, and an actuator 34 that is accommodated in the base portion. The base portion 33 is surrounded by the connection portions 32 with respect to the arms 20. That is, the connection portions 32 with respect to the arms 20 are provided in the outer periphery of the side wall 33b, and three connection portions 32 in total are disposed so as to surround the base portion 33. Furthermore, the tip end of the connection portion 32 includes the pair of the spherical convex portions 32a, and these convex portions 32a protrude toward both sides of the side wall 33b in the circumferential direction.

The actuator 34 is fixed onto the partition plate 33c, and is connected to the controller 5 through a cable 34a. The actuator 34 includes, for example, a motor, a speed reducer, and a sensor, and includes an output shaft 34b. The output shaft 34b points downward along the center axis CL2 of the side wall 33b, and is inserted through the partition plate 33c. The tip end of the output shaft 34b is located inside the projection portion 35, and a pinion pulley 34c is provided at the tip end. The cable 34a is wired along the arm 20 (see FIG. 2).

The projection portion 35 is formed in a circular shape in the top view, and the center axis CL3 is parallel to the center axis CL2 of the side wall 33b of the base portion 33. That is, the center axis CL3 is located outside an area A1 surrounded by three connection portions 32 in the base portion 33 and is perpendicular to the plane including the area A1. Further, the center axis CL3 is located outside the side wall 33b and is located between two adjacent connection portions 32. The distance between the center axis CL3 and the center axis CL2 is defined in consideration of the shape of the area A1 or the size of a vacuum hose 48.

The projection portion 35 includes a rotation member 36. As illustrated in FIG. 5, the end effector 40 is fixed to the lower surface of the rotation member 36. The rotation member 36 is rotated about the center axis CL3 by the actuator 34 as a drive source. That is, the rotation member 36 rotates about the rotation axis CL3 that is located outside the area A1 surrounded by the plural connection portions 32. The projection portion 35 includes an upper opening 35a and a lower opening 35b. The upper opening 35a and the lower opening 35b are formed at a position where the rotation member 36 is accommodated.

The rotation member 36 is formed in a cylindrical shape, and one end thereof is provided with a flange-shaped pulley 36a. A through-hole 36c is formed at the center of the rotation member 36 so as to extend in the axial direction. A through-hole 37 is formed by the through-hole 36c, the upper opening 35a, and the lower opening 35b. That is, the upper opening 35a and the lower opening 35b respectively expose both ends of the through-hole 36c to the outside of the projection portion 35. The projection portion 35 includes two openings 35a and 35b that expose both ends of the through-hole 36c. The through-hole 37 is provided along the center axis CL3, and penetrates the projection portion 35 including the rotation member 36 in the vertical (up-down) direction. The through-hole 37 is provided to allow the vacuum hose 48 for driving the end effector to pass therethrough (see FIG. 5). When the end effector 40 is fixed to the rotation member 36, the end effector 40 becomes rotatable about the center axis CL3 as the rotation axis.

The rotation member 36 is accommodated inside the projection portion 35 with a bearing 35c so that the pulley 36a is located at the upside, and the lower end 36b of the rotation member 36 is inserted through the lower opening 35b. A timing belt 34d is attached between the pulley 36a and the pinion pulley 34c, so that power is transmitted from the output shaft 34b of the actuator 34 to the rotation member 36. That is, the projection portion 35 includes a transmission M1 that transmits power from the actuator 34 to the rotation member 36. The actuator 34 rotates the rotation member 36 in response to the command from the controller 5. Since both the actuator 34 and the rotation member 36 are disposed in the wrist portion 30, the transmission M1 is simplified. Furthermore, a mechanism using a gear or the like may be employed as the transmission M1 instead of the timing belt 34d.

The end effector 40 is fixed to the wrist portion 30 through the rotation member 36. The end effector 40 moves with the wrist portion 30 and rotates with the rotation member 36. The end effector 40 is of a type with an astrictive function, and includes a pillar-shaped portion 41 that is fixed to the rotation member 36, two astrictive portions 42, and a flange portion 45 to which the astrictive portions 42 are fixed. The pillar-shaped portion 41 is attached to the lower end surface 36d of the rotation member 36 by a bolt (not illustrated) or the like. The flange portion 45 is provided at the outer periphery of the pillar-shaped portion 41, and two astrictive portions 42 are disposed with the pillar-shaped portion 41 interposed therebetween. Furthermore, the number of the astrictive portions 42 may be one or three or more.

The astrictive portion 42 includes an astrictive port 42a that is opened downward. The astrictive portion 42 is connected to a vacuum pump (not illustrated) disposed at a position close to the robot body 10 through the vacuum hose 48. A valve (not illustrated) is provided in the middle of the vacuum hose 48, and the opening and closing states of the valve are controlled by the controller 5. In response to the command from the controller 5, the valve selects an on state where the astrictive portion 42 communicates with the vacuum pump or an off state where the astrictive portion 42 does not communicate with the vacuum pump. In the on state, the astrictive port 42a attracts the workpiece W by the suction force generated from the vacuum pump. In the off state, the astrictive port 42a loses the suction force, so that the workpiece W is released. The picking device 100 repeats an operation in which the valve is switched on to attract the workpiece W by the end effector 40, the end effector 40 is conveyed to a target position in this state, and the valve is switched off to release the workpiece W. Accordingly, this performs operations such as arranging the workpieces W and putting the workpieces W into boxes.

The vacuum hose 48 is wired along an arm 20A connected to a connection portion 32A adjacent to the through-hole 37, passes through the through-hole 37 and is connected to the astrictive portion 42. In this embodiment, one vacuum hose 48 is connected to each astrictive portion 42, and two vacuum hoses 48 are used in total. The two vacuum hoses 48 may be wired together along one arm 20A, but may be wired separately along different arms 20A. In this case, each vacuum hose 48 may be wired along each of two arms 20A that are respectively connected to two connection portion 32 adjacent to the through-hole 37 among the three arms 20. For example, in the above-described configuration in which the rotation axis CL3 is located between two adjacent connection portions 32, the vacuum hoses 48 may be provided separately in two arms 20A respectively connected to the two adjacent connection portions 32.

As the vacuum hose 48, a vacuum hose having an outer diameter of about 5 to 50 mm may be exemplified. Furthermore, the opening diameter of the through-hole 37 is set so that a sufficient gap may be formed even when plural vacuum hoses 48 are wired.

In this embodiment, the vacuum hose 48 passes along a route R1 that reaches the through-hole 37 along the arm 20A and a route R2 that reaches the end effector 40 through the through-hole 37. Since the through-hole 37 is located in the vicinity of the connection portion 32 with respect to the arm 20A, the length of the route R1 scarcely changes even when the end effector 40 moves and rotates. The length of the route R2 does not change even when the end effector 40 moves. Since the distance from the rotation axis CL3 to the astrictive portion 42 does not change even when the end effector 40 rotates, a change in the length of the route R2 with the rotation of the end effector 40 is small. That is, the length of the route R2 scarcely changes even when the end effector 40 rotates.

In this way, the lengths of the routes R1 and R2 along which the vacuum hoses 48 pass change little even when the end effector 40 moves and rotates. On the contrary, when the wrist portion without the through-hole 37 is used, the vacuum hoses 48 may not follow the routes of which the lengths change little like the routes R1 and R2.

Figure 6:
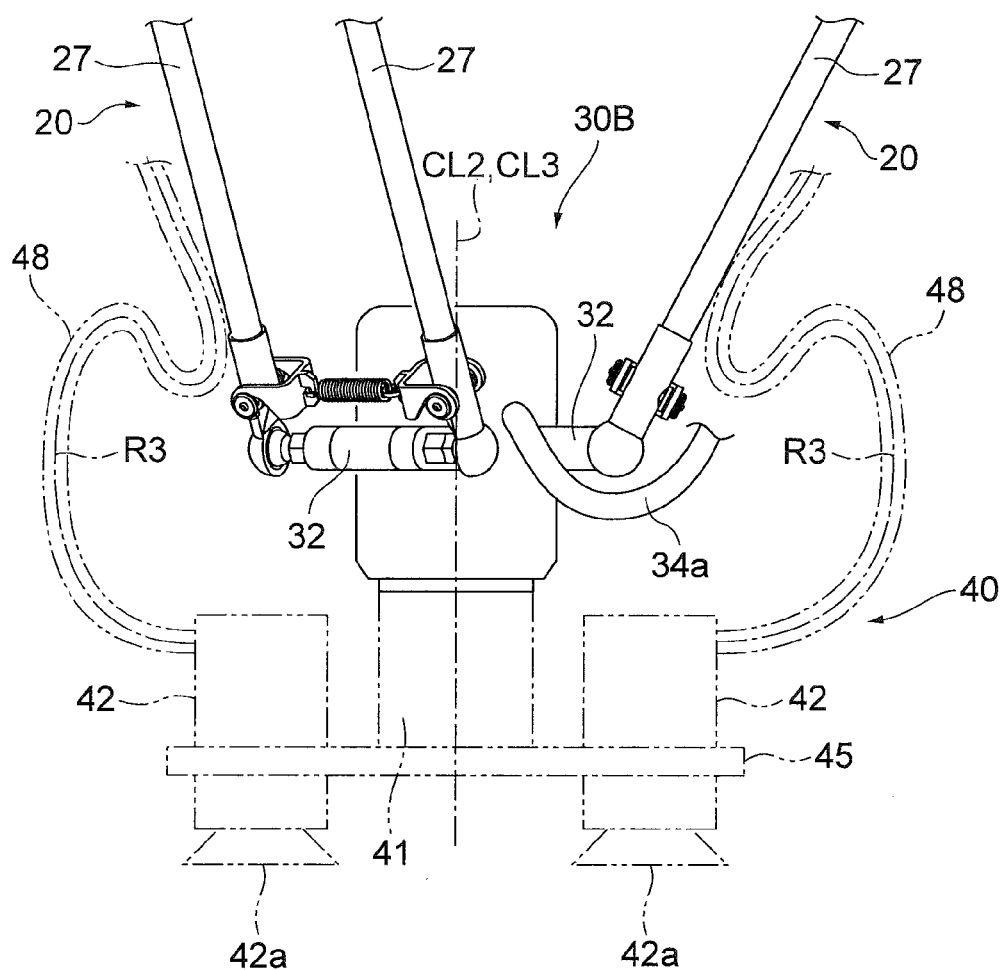
FIG. 6 is a side view illustrating a wrist portion without a through-hole and a vacuum hose connected thereto.

FIG. 6 is a diagram illustrating the wrist portion 30B that does not have the through-hole 37 and of which the rotation axis CL3 matches the center axis CL2 and two vacuum hoses 48. As illustrated in FIG. 6, the vacuum hose 48 is largely loosened from the tip end 22a of the arm 20 to the astrictive portion 42. This is because the length of the route R3 from the tip end 22a of the arm 20 to the astrictive portion 42 largely changes in accordance with the movement and the rotation of the end effector 40. When the vacuum hose 48 is not sufficiently loosened, the vacuum hose 48 is excessively stretched when the end effector 40 moves and rotates. Meanwhile, when the vacuum hose 48 is excessively loosened, there is a concern that the vacuum hose 48 may contact the peripheral object thereof and the motion of the end effector 40 may become instable. Accordingly, there is a need to carefully wire the vacuum hose 48 when the end effector 40 is attached so as to prevent such problems.

On the contrary, according to this embodiment, as described above, the change amounts of the routes R1 and R2 are sufficiently small even when the end effector 40 moves and rotates. Accordingly, since there is no need to largely loosen the vacuum hose 48 and the above-described problems do not occur, it is easy to wire the vacuum hose 48 when attaching the end effector 40. Further, since two vacuum hoses 48 are wired separately in different arms 20A, the repulsive force that is generated by the deformation of the vacuum hose 48 may be distributed to two arms 20A. Accordingly, it is possible to further reliably reduce the influence of the vacuum hose 48 with respect to the movement and the rotation of the end effector 40.

Furthermore, the parallel robot 50 may be controlled by minutely adjusting the setting of the control program for the parallel robot including the existing wrist portion illustrated in FIG. 6, that is, the wrist portion of which the rotation axis CL3 matches the center axis CL2. That is, a distance (offset) between the rotation axis CL3 and the center axis CL2 may be input in advance and the track of the wrist portion may be generated in consideration of the offset.

While the embodiment has been described in detail, the present invention is not limited to the above-described embodiment, and various modifications may be made without departing from the spirit of the present invention. For example, the rotation axis CL3 may not be essentially located between two connection portions 32.

The parallel robot 50 may include four or more actuators 12 and four or more arms 20. The end effector 40 may be a robot hand that grips a workpiece W. As the robot hand, a robot hand that is driven by an air pressure, an electric actuator, or the like may be exemplified. In a case where an air pressure is needed as an end effector for driving source, an air supply hose may be wired instead of the vacuum hose 48. Alternatively, in a case where electric power is needed as a driving source for an end effector, a power feeding cable may be wired instead of the vacuum hose 48. Further, a cable for sending and receiving a control signal may be wired through the through-hole 37 along with a hose or a cable for driving the end effector.

The application example of the parallel robot 50 is not limited to the picking device, and may be applied to, for example, an assembly device for an industrial product such as an electronic component.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A parallel robot comprising:
    a plurality of actuators;
    a wrist portion;
    a plurality of arms that respectively connect the wrist portion to the plurality of actuators,
    wherein the wrist portion includes
        a base portion that includes a plurality of connection portions respectively connected to the plurality of arms, and
        a rotation member that rotates about a rotation axis located outside an are surrounded by the plurality of connection portions, wherein the rotation member is provided with a through-hole formed along the rotation axis, wherein the rotation axis intersects a plane including the area surrounded by the plurality of connection portions, and wherein the rotation axis is permanently located between two adjacent connection portions along a circumferential direction of the plurality of connection portions.

2. The parallel robot according to claim 1,
wherein the base portion includes an actuator that rotates the rotation member.

3. The parallel robot according to claim 2,
wherein the wrist portion further includes a projection portion that is provided at a position offset from the position of the base portion,
wherein the rotation member is accommodated in the projection portion, and
wherein the projection portion includes two openings that expose both ends of the through-hole of the rotation member and a transmission that transmits power from the actuator to the rotation member.

4. The parallel robot according to claim 1, further comprising:
an end effector that is fixed to the rotation member; and
a hose or cable for driving the end effector,
wherein the hose or cable is wired through the through-hole.

5. The parallel robot according to claim 2, further comprising:
an end effector that is fixed to the rotation member; and
a hose or cable for driving the end effector,
wherein the hose or cable is wired through the through-hole.

6. The parallel robot according to claim 4,
wherein the hose or cable is wired along the arm connected to the connection portion adjacent to the through-hole.

7. The parallel robot according to claim 5,
wherein the hose or cable is wired along the arm connected to the connection portion adjacent to the through-hole.

8. The parallel robot according to claim 6,
wherein a plurality of the hoses or cables, including the hose or cable, are provided and the rotation axis is located between the two adjacent connection portions, and
wherein the plurality of hoses or cables are provided separately along the two arms respectively connected to the two adjacent connection portions.

9. The parallel robot according to claim 7,
wherein a plurality of the hoses or cables, including the hose or cable, are provided and the rotation axis is located between the two adjacent connection portions, and
wherein the plurality of hoses or cables are provided separately along the two arms respectively connected to the two adjacent connection portions.

10. The parallel robot according to claim 1,
wherein the wrist portion further includes a projection portion that is provided at a position offset from the position of the base portion,
wherein the projection portion includes an upper opening and a lower opening formed at opposite ends of the through-hole of the rotation member, and
wherein the rotation member protrudes below the lower opening of the projection portion.

11. A parallel robot comprising:
a plurality of actuators;
a wrist portion;
a plurality of arms that respectively connect the wrist portion to the plurality of actuators;
an end effector; and
a plurality of hoses or cables for driving the end effector,
wherein the wrist portion includes
a base portion that includes a plurality of connection portions respectively connected to the plurality of arms, and
a rotation member that rotates about a rotation axis located outside an area surrounded by the plurality of connection portions,
wherein the rotation member is provided with a through-hole formed along the rotation axis, and
wherein the plurality of hoses or cables are wired through the through-hole and are each wired along a respective one of the plurality of arms disposed adjacent to the through-hole.

12. The parallel robot according to claim 11,
wherein the wrist portion further includes a projection portion that is provided at a position offset from the position of the base portion,
wherein the projection portion includes an upper opening and a lower opening formed at opposite ends of the through-hole of the rotation member, and
wherein the rotation ember protrudes below the lower opening of the projection portion.

* * * * *